(12) United States Patent
Parker et al.

(10) Patent No.: US 12,669,307 B2
(45) Date of Patent: Jun. 30, 2026

(54) DIRECT ENHANCED VIEW OPTIC

(71) Applicant: Marsupial Holdings, Inc., Waitsfield, VT (US)

(72) Inventors: William Parker, Waitsfield, VT (US); Michael Strauss, Waitsfield, VT (US)

(73) Assignee: Marsupial Holdings, Inc., Waitsfield, VT (US)

( * ) Notice: Subject to any disclaimer, the term of this patent is extended or adjusted under 35 U.S.C. 154(b) by 716 days.

(21) Appl. No.: 17/932,782

(22) Filed: Sep. 16, 2022

(65) Prior Publication Data

US 2023/0194207 A1 Jun. 22, 2023

Related U.S. Application Data

(63) Continuation of application No. 17/268,516, filed as application No. PCT/US2019/046669 on Aug. 15, 2019, now Pat. No. 11,480,410.

(60) Provisional application No. 62/790,294, filed on Jan. 9, 2019, provisional application No. 62/764,725, filed on Aug. 15, 2018.

(51) Int. Cl.
| | |
|---|---|
| *F41G 1/38* | (2006.01) |
| *F41G 1/30* | (2006.01) |
| *G02B 27/01* | (2006.01) |
| *F41G 1/36* | (2006.01) |

(52) U.S. Cl.
CPC ................. *F41G 1/38* (2013.01); *F41G 1/30* (2013.01); *G02B 27/0103* (2013.01); *F41G 1/36* (2013.01)

(58) Field of Classification Search
None
See application file for complete search history.

(56) References Cited

U.S. PATENT DOCUMENTS

| | | | |
|---|---|---|---|
| 5,852,492 A | 12/1998 | Nimblett et al. | |
| 6,449,892 B1 | 9/2002 | Jenkins | |
| 10,345,077 B1 * | 7/2019 | Loebig | G03H 1/2249 |
| 2011/0180654 A1 | 7/2011 | Thiesen et al. | |

(Continued)

FOREIGN PATENT DOCUMENTS

WO 2018057872 A1 3/2018

OTHER PUBLICATIONS

Lahousse, Alexandre, EPO Supplementary Search Report, Oct. 10, 2022.

*Primary Examiner* — Derek S. Chapel
(74) *Attorney, Agent, or Firm* — Downs Rachlin Martin PLLC

(57) ABSTRACT

A holographic display system for attaching to a firearm provides a user with enhanced target acquisition information, such as real time ballistic solutions, fused thermal imaging, extended zoom, and automatic target recognition. The holographic display system may include a waveguide, a light engine, holographic optical element, a casing and a coupler. The holographic optical element is positioned between the light engine and the waveguide and the coupler is attached to the casing, The light engine is configured to generate and transmit displayable information to the holographic optical element, and the holographic optical element includes a diffractive grating configured to guide the displayable information into the waveguide. The waveguide is configured to propagate the displayable information and transmit the displayable information as a distant image to a user of the holographic display system.

3 Claims, 12 Drawing Sheets

(56)  References Cited

U.S. PATENT DOCUMENTS

| | | | |
|---|---|---|---|
| 2012/0097741 A1 | 4/2012 | Karcher | |
| 2012/0102808 A1 | 5/2012 | Matthews et al. | |
| 2012/0212820 A1 | 8/2012 | Jiang et al. | |
| 2015/0108215 A1 | 4/2015 | Ehrlich | |
| 2015/0362651 A1* | 12/2015 | Voloschenko | G02B 23/26 |
| | | | 359/9 |
| 2016/0061549 A1 | 3/2016 | Patterson et al. | |
| 2016/0377378 A1* | 12/2016 | Collin | G02B 23/10 |
| | | | 42/113 |
| 2018/0224652 A1 | 8/2018 | Havens et al. | |
| 2019/0129162 A1* | 5/2019 | Hodelin | F41G 1/38 |

* cited by examiner

600

Receive inputs — 604

Develop ballistics information — 608

Present information to user — 612

DIRECT ENHANCED VIEW OPTIC

FIELD OF THE INVENTION

The present invention generally relates to firearm and artillery optics. In particular, the present invention is directed to a Direct Enhanced View Optic.

BACKGROUND

Modern firearms and ballistic missiles accelerate projectiles at high speeds to strike distant targets, some of which may be difficult, or even impossible, to view and/or track with the naked eye. To help direct such projectiles to their distant targets, targeting sights have been developed that allow a user to aim a firearm at a target using the user's vision to align the two. Telescopic gunsights are a rather highly developed art. The early developments included telescopes incorporating posts and cross hairs to improve visibility and assist in aiming at long range targets. More recently, variable power scopes have been developed having a zoom lens to permit the user to vary the degree of magnification. Further developments include stadia reticle (stadia marks), or varying scales, to facilitate in measuring, or estimating, the range to the target and also means for adjusting and compensating for range, or drop, of the projectile to the target. Using scopes can improve the probability of successfully hitting a target at relatively long ranges, e.g., at distances of more than 1,000 meters.

However, environmental and user factors, such as lighting, distance, movement, mental fatigue, situational factors (being fired upon), etc., can greatly impact the accuracy of rifle and other projectile weapon firearms. Without accurate range and sensory information, the probability of hitting a target can be less than 10% when engaging targets at ranges of interest. Moreover, at longer firing ranges, the impact of environmental and user factors, and resulting targeting inaccuracy, can be exponentially amplified.

SUMMARY OF THE DISCLOSURE

In an exemplary embodiment, a display system for enhancing a user's view through an optical instrument includes holographic display component configured to be coupled to the optical instrument. The holographic display component includes a light engine, a lens, at least one holographic optical element, and an image guide. When coupled to the optical instrument, the holographic display component transmits a see-through holographic image overlay on the user's view through the optical instrument.

In another embodiment, a direct view optic for a firearm includes an optical device having a front objective, a rear ocular exit, and a waveguide. The front objective and the rear ocular exit are separated by the waveguide and the optical device projects a distant image onto a display. A diffractive based holographic display system is coupled to the optical device, and the holographic display system provides a see-through information overlay on the display.

In another embodiment, a safe triggering firearm with direct view optic is provided that includes a firearm with a locking mechanism, an optical device operatively coupled to the locking mechanism, the optical device having a front objective, a rear ocular exit, and a waveguide, the front objective and the rear ocular exit separated by the waveguide, wherein the optical device provides a distant image onto a display, and a diffractive based holographic display system coupled to the optical device. The holographic display system provides a see-through information overlay on the display and the diffractive based holographic display system includes a processor including a set of instructions for identifying a target from the display, locking onto the target, and unlocking the locking mechanism only after locking onto the target.

In another embodiment, a holographic display system for attaching to a firearm, includes a casing having an enclosure and a receptacle, a light engine housed in the enclosure, a waveguide encompassed by the receptacle, and a coupler attached to the casing, the coupler sized and configured to mount to the firearm. The light engine transmits information to the waveguide and the waveguide produces a holographic image to a user of the display system.

In another embodiment, a holographic display system for inclusion with a direct enhanced view optic that is used to enhance the view of a scene includes a processor configured to receive signals from respective ones of a plurality of remote source devices and to prepare information based upon the signals, a video processor in electronic communication with the processor and configured to receive a plurality of video inputs and the information and perform low power video processing so as to prepare displayable information, a projector configured to receive the displayable information from the video processor and to project images representative of the displayable information, and a holographic image display configured to receive the images from the projector and to display the images to a user. The images are based on the information received by the processor and the plurality of video inputs.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1:
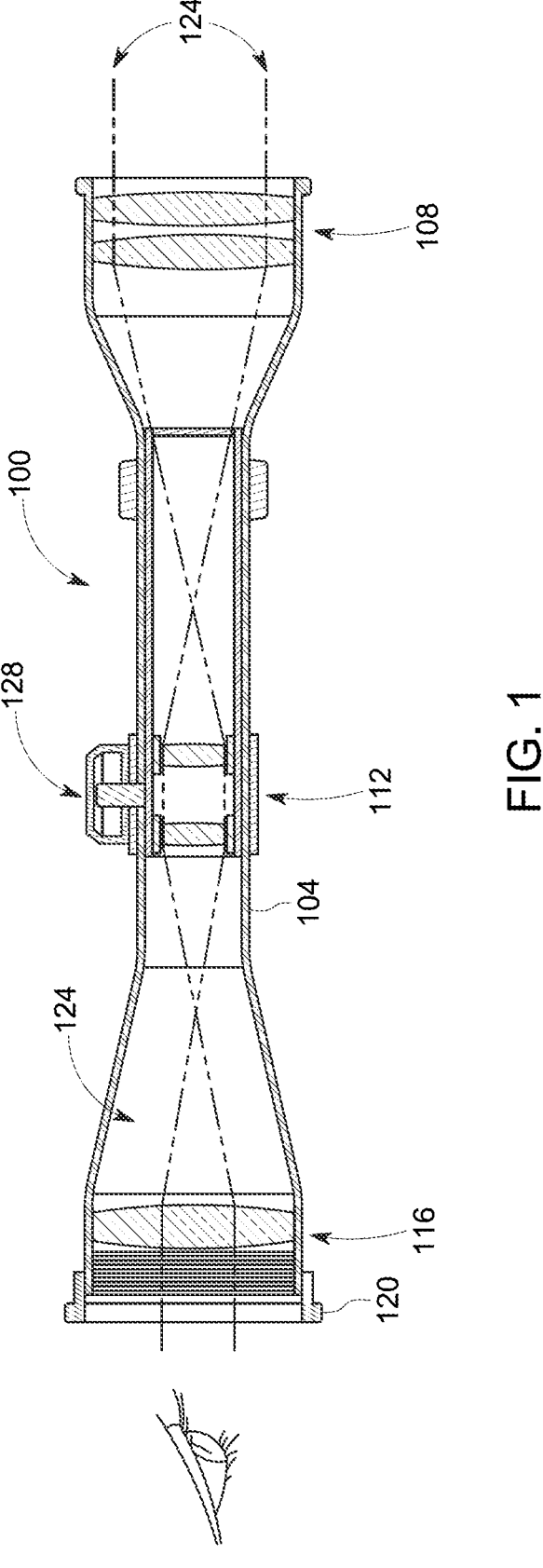
FIG. 1 is a cut-away plan view of a direct enhanced view optic according to an embodiment of the present invention.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding steps to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

A direct enhanced view optic (DEVO) according to embodiments of the present invention provides a user with enhanced target acquisition information, such as real time ballistic solutions, fused thermal imaging, extended zoom, and automatic target recognition. Certain embodiments of the DEVO can include one or more of the following components and capabilities: a laser rangefinder; a ballistics engine coupled to a plurality of sensors (such as environmental, elevation/cant, compass, and inertial measurement units); a high performance, low power image processing and neural network system; a fused overall external imaging sensor with image processing to co-align off axis optical systems (e.g., thermal imagers or an extended zoom camera on the side rail of a firearm); self-calibration techniques for displaying an image on the direct view optic (scope) reticle; real-time display of ballistic solutions; an interface to power/data rails; real-time image processing for inputted video, such as high dynamic range, sensor fusion, contrast enhancement, multi-spectral, and low-light processing; displaying of geo-referenced augmented reality information; neural network automatic target recognition and highlighting (a box can be placed around people visible in the scope field of view or a "lock" on a user selectable object). The DEVO can reduce time to acquire targets, increase situational awareness and first shot probability of hit, reduce mental loading, reduce training requirements, and increase overall lethality.

Turning now to the figures, and in particular FIG. 1, there is shown a DEVO 100 according to an embodiment of the present disclosure. DEVO 100 includes a housing 104, an objective lens group 108, an erector lens group 112, an ocular lens group 116, and a holographic display system 120. Objective lens group 108, erector lens group 112, and ocular lens group 116, collectively comprise an ocular path 124, which is the path that light travels upon entering the DEVO 100 proximate the objective lens group 108.

Housing 104 is typically sized and configured to couple to a firearm, to protect the lenses included therein, and to provide the foundation for ocular path 124 that is formed by the lens groups as discussed above. In general, the size and configuration of housing 104 is a function of the desired capabilities of DEVO 100. For example, adjustment controls, magnification, and objective lens diameter impact the size and configuration of housing 104. In general, housing 104 can have varying sizes made from a variety of materials, e.g., metals, plastics, etc. DEVO 100's that are intended for long range and/or low light usage generally feature larger housing 104 diameters (when measured at the objective end of the DEVO).

Objective lens group 108 transmits available ambient light into housing 104. While objective lens group 108 is shown in FIG. 1 as a plurality of lenses, only one lens may be employed. Each lens in objective lens group 108 can have a diameter between about 19 mm and 75 mm or more, with larger objective lenses being able to direct in more ambient light to housing 104. DEVO 100's that are intended for long range and/or low light usage generally feature larger objective lenses.

Erector lens group 112 determines the magnification capabilities of DEVO 100. In an embodiment, adjustment knob 128 is capable of moving one of the erector lenses closer or further from another one of the erector lenses, thereby changing the magnification. While erector lens group 112 is shown in FIG. 1 as two lenses, more lenses may be employed. On a fixed power scope, the erector lens group is statically positioned.

Ocular lens group 116 (also referred to as an eyepiece) presents the final image to the user for viewing. The configuration of ocular lens group 116 determines the distance between the user's eye when positioned to view the entire image and the surface of the ocular lens. Ocular lens group 116 can be configured to allow for diopter setting adjustments so as to focus a reticle (not shown). As with objective lens group 108 and erector lens group 112, more or fewer lenses can be employed with ocular lens group 116 to produce the desired output to the user.

Figure 2A:
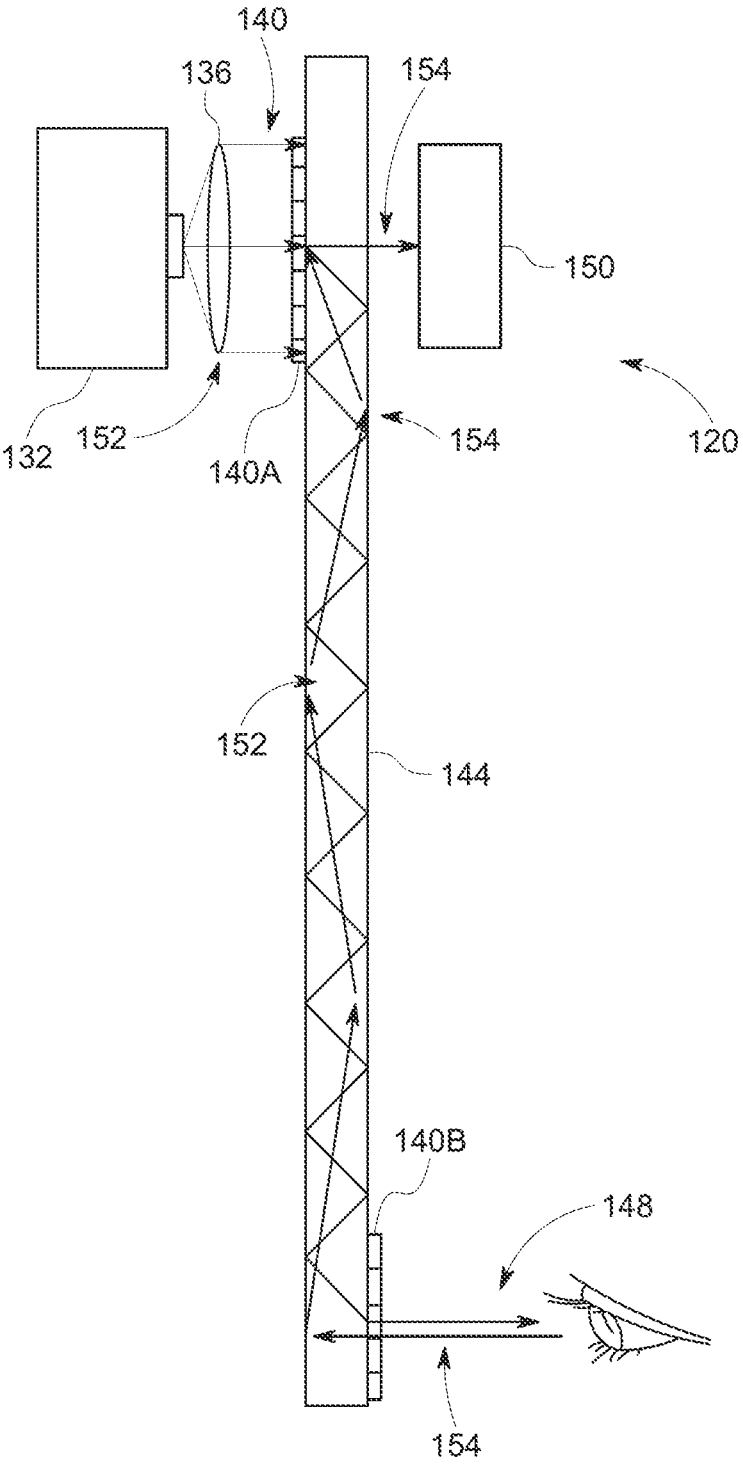
FIG. 2A is a schematic view of a holographic display system according to an embodiment of the present invention.
Figure 2B:
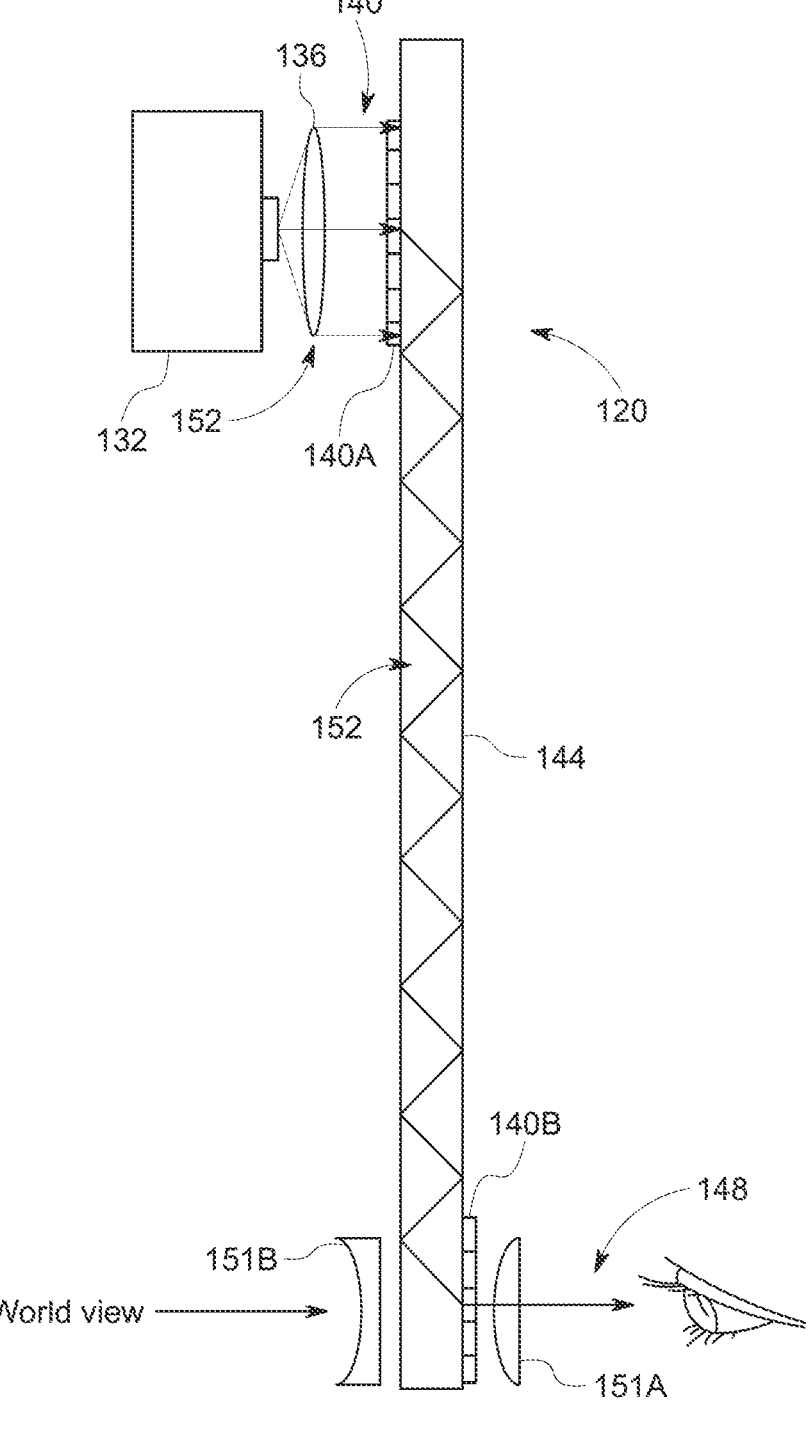
FIG. 2B is another schematic view of a holographic display system including additional optical components according to an embodiment of the present invention.

With reference to FIGS. 2A and 2B, holographic display system 120 provides additional information, described in more detail below, to the user that is overlaid, in a substantially see-through fashion, upon the images that are viewable through DEVO 100. In an embodiment, holographic display system 120 includes a light engine 132, a lens 136, holographic optical elements (HOE) 140 (HOEs 140A and 140B), and an image guide 144 that combine to produce a holographic image display (HID) 148 (described with reference to FIG. 3) for viewing by the user. As shown in FIGS. 2A and 2B, holographic display system 120 produces viewable information 152 that is sent from light engine 132 to lens 136, then to HOE 140A for propagation along image guide 144 to HOE 140B, which reflects the information to the user in the form of holographic image display 148. Although FIGS. 2A and 2B show that HOE 140A and HOE 140B are on opposing sides of image guide 144, HOE 140A and 140B may be positioned on the same side of the image guide (an example of this setup is shown in FIG. 8B).

In an embodiment, holographic display system 120 attenuates less than 2% of the light entering DEVO 100 (notable when comparing system 120 with, for example, beam splitting technologies that inherently attenuate 20% to 30% of the incoming light, which makes targets more difficult to detect and identify and limits the use of the scope in low-light conditions). In an embodiment, holographic display system 120 can include a camera 150 to track the user's eyeball (along light path 154) for various inputs, e.g., retinal authentication or identification, or can assist with parallax correction, training (determining whether the user's cheek weld is consistent, e.g., the user's eye is in the same place every time). In certain embodiments, illumination, such as infrared light, can also be provided at camera 150 so as to assist with the analysis of the location of the eyeball (infrared light can be used to "pull" an image of the user's eye by sending infrared light down it). The light illuminates the user's iris and retina. This light is then sent back up the image guide (along light path 154) where camera 150 captures the image and then the image is processed. In this way, the image guide is used both to display an image to the user and to gather an image from the eye.

In another embodiment, holographic display system 120 communicates a location of a round of ammunition shot from the firearm while the ammunition is in flight. In another embodiment, holographic display system 120 tracks a round of ammunition shot from the firearm while the ammunition is in flight and directs the round while the round is in flight. Holographic displays system 120 can provide this information, for example, by using a camera or sensor that tracks the rounds as they travel down range. Suitable cameras include a thermal camera, a high speed camera, a passive wavefront camera, etc., or the bullets can be modified to have a "tracer" in the back. Holographic display system 120 can track the rounds, rebuild their flight path, display the path to the user, and display a corrected and geo-rectified path in 3D to the user, which would then allow the user to correct the next shot. Additionally or in the alternative, holographic display system 120 can communicate with rounds flying downrange, correcting their flight pattern. Exemplary armaments for tracking and correction are described in U.S. Pat. No. 10,088,286, titled "Target Assignment Projectile", which is incorporated by reference for its discussion of the same.

Light engine 132 can produce a full color, sunlight readable, high resolution holographic image for transmission to a user of DEVO 100. The image produced by light engine 132 can be read against the brightest scenery (e.g., a sunlit cloud in the sky), while still dimming enough to be compatible with night vision goggles. Beam splitting prisms cannot handle full color without further attenuation over the attenuation discussed above and cannot produce images with the desired clarity/readability in bright light (e.g., sunlight).

Figure 3:
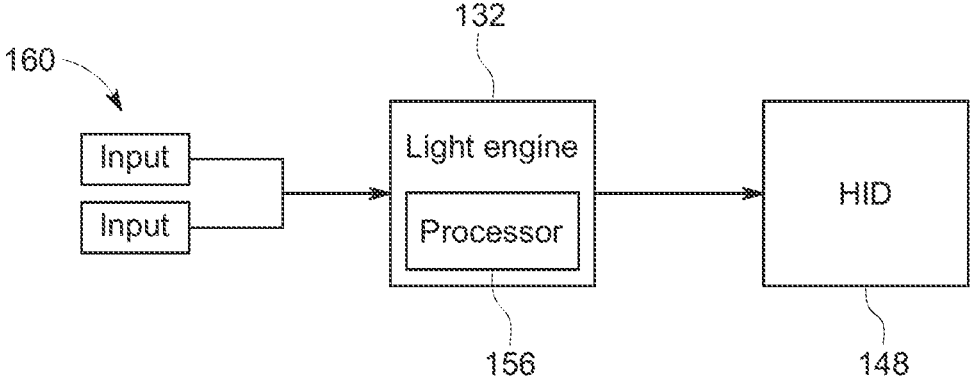
FIG. 3 is a block diagram of a holographic display system according to an embodiment of the present invention.

Light engine 132 includes a processor 156 (FIG. 3) and receives information from one or more inputs 160 (FIG. 3). Processor 156 is preferably a high performance, low power processor, with accelerated image processing, capable of executing a set of instructions (described in more detail below) such that light engine 132 can produce homographic image display 148 from inputs 160. Additionally, in certain embodiments, processor 156 can co-align off-axis optical systems to the real world viewed through the scope to mitigate parallax. For example, processor 156 can align a thermal imaging camera (not shown) input or an extended optical zoom camera (not shown) input that are mounted proximate to DEVO 100. Processor 156 can provide real-time image processing for inputted video, such as high dynamic range processing, sensor fusion, contrast enhancement, and low-light processing. In certain embodiments, processor 156, in combination with inputs 160, provides geo-referenced augmented reality information when connected real-time or with preloaded object location information.

Lens 136 is sized and configured to transmit the display information from light engine 132 to HOE 140A such that the display information can be transmitted through image guide 144. HOE 140A may also have the optical functions of lens 136 included into its design, thus eliminating the need for the extra optic(s).

HOEs 140 are translucent selective wavelength gratings that are designed and configured to steer displayable information 152 into and out of image guide 144. In an embodiment, HOEs 140 are capable of directing displayable information 152 through image guide 144 using total internal reflections. As shown in FIGS. 2A and 2B, HOE 140A modifies displayable information 152 received from light engine 132 so as to guide the display information through image guide 144 toward HOE 140B. HOE 140B directs the display information to the user to be viewed when looking through DEVO 100. In an embodiment, HOEs 140 are prepared using laser beam interference techniques. For example, two laser beams may be directed at a substrate so as to produce a pattern of straight lines with a sinusoidal cross section, with the pitch of the grating being approximately $\lambda/\sin\theta$. Although FIGS. 2A and 2B show HOE 140A positioned between lens 136 and image guide 144, the HOE could also be positioned on the opposite side of the image guide.

Image guide 144 is a translucent plate that propagates wavelengths substantially internally. Image guide 144 can be many different shapes, including, but not limited to, rectangular and circular (as shown and discussed in more detail in relation to FIG. 6).

Figure 4:
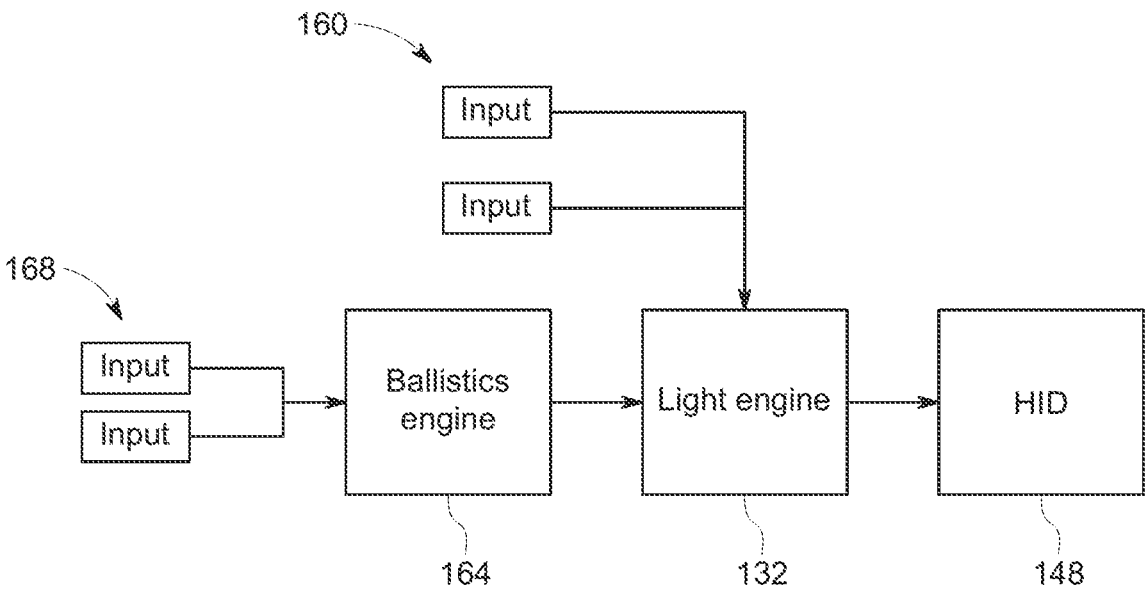
FIG. 4 is a block diagram of another holographic display system according to an embodiment of the present invention.

As discussed above, light engine 132 receives one or more inputs 160. The sources for inputs 160 can include, but are not limited to, a video input, a rangefinder input, a global position system coordinate or related information (e.g., a direction, an elevation, and/or a cant), an inertial measurement unit, one or more sensor inputs (such as, but not limited to, temperature, pressure, humidity, wind speed, and light), and ballistics information. As discussed below and as shown in FIG. 4, certain inputs 168 may first be transmitted to a ballistics engine 164, which produces ballistics information such as, but not limited to, distance to target and projected projectile path, from sensed information such as, but not limited to, wind speed, ammunition information, 3D scene information, temperature, altitude, and humidity. In certain embodiments, light engine 132 may encompass or be integral with a ballistics engine.

In FIG. 2B, holographic display system 120 is shown with additional optical components 151A and 151B. The use of additional optical components may be necessary to place an image onto the first or second focal plane, as the image guide should not interfere with DEVO 100. Optical components 151A and 151B assist with alignment and focus between the world view and the content displayed to the user. Optical components 151A and 151B can be refractive, diffractive, or hybrid optical elements. While optical components 151A and 151B are shown with particular shapes in FIG. 2B, these should not be taken as limiting as various combinations of optical elements (or additional elements) may be used so as to properly align and focus the images within DEVO 100 for viewing along with the images created by light engine 132.

Figure 5:
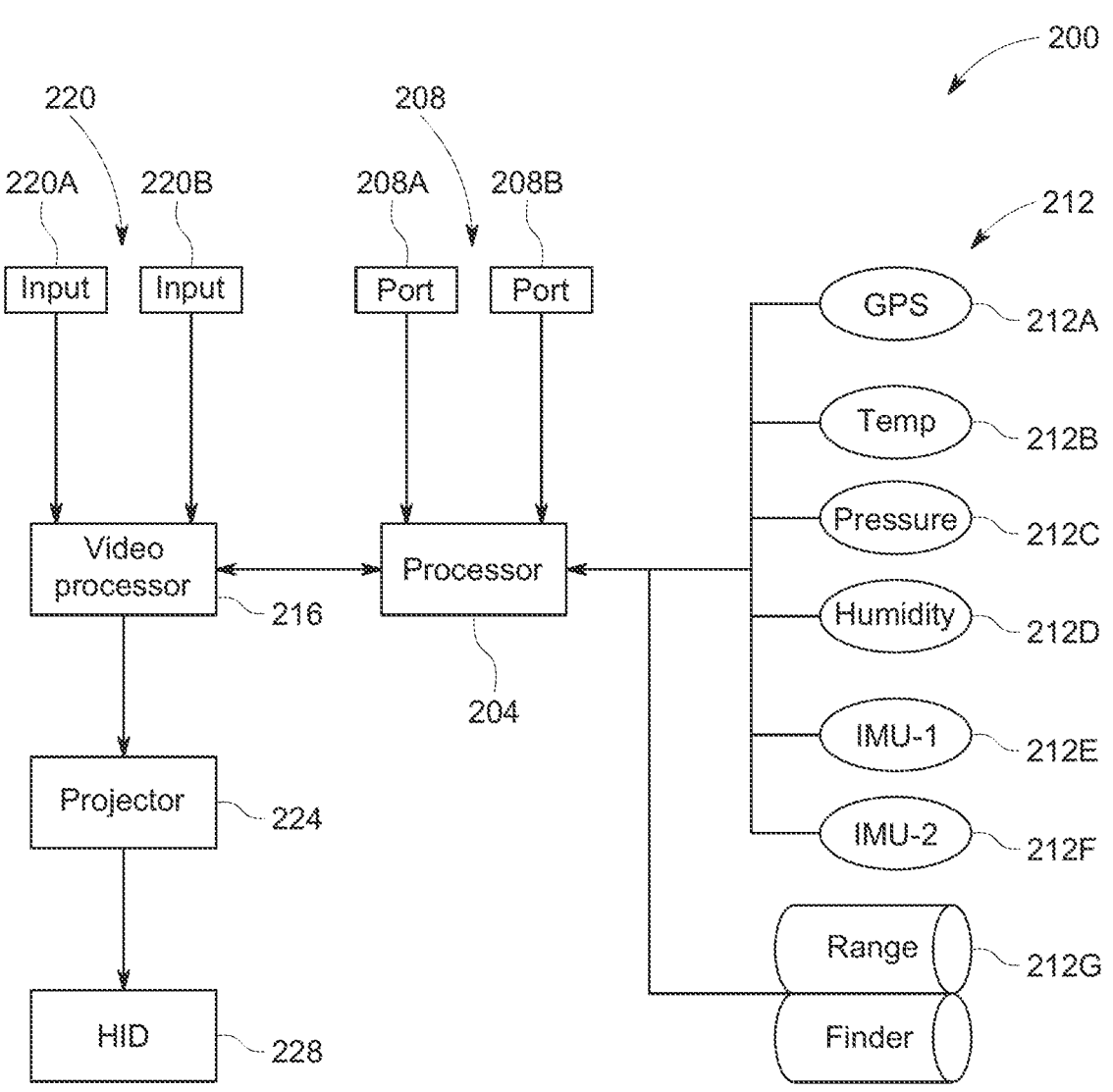
FIG. 5 is a block diagram of another holographic display system according to an embodiment of the present invention.

Turning now to FIG. 5, there is shown another embodiment of a holographic display system for inclusion with DEVO 100, holographic display system 200. At a high level, holographic display system 200 provides useful information to a user of DEVO 100 that is overlaid upon what the user can view through the optics provided with DEVO 100, the useful information being collected/received from a plurality of source devices 212 (212A-212G). For example, additional information that may be useful to the user of DEVO 100, including, but not limited to, environmental information, ballistics information, and situational information may be provided to the user through DEVO 100 via holographic display system 200. In the embodiment shown in FIG. 5, holographic display system 200 includes a processor 204 which receives information from one or more ports 208 (208A-208B) and one or more source devices 212 (sensors or similar information gathering devices). Processor 204 interacts with a video processor 216, which can receive inputs from video inputs 220 (220A-220B). Video processor 216 provides information to projector 224, which transmits the images that appear on holographic image display 228.

Processor 204 can be a microprocessor suitable for processing large volumes of information without requiring a significant power source (preferably less than 0.5 watt). Processor 204 can be designed and configured to allow for the transmission of information from one or more ports 208, such as an RS-232 serial port, micro-USB port, USB-A, B, or C port, and the like, that may be coupled to the processor via coupling hardware known in the art. These ports 208 can allow for information collection and alignment from ancillary equipment such as thermal cameras, optical zooms, night vision equipment, or communication devices that couple, via an internet protocol, to the internet so as to provide additional information to the user of the DEVO. Processor 204 can also receive information from one or more source devices 212, such as, but not limited to, GPS sensor 212A, temperature sensor 212B, pressure sensor 212C, humidity sensor 212D, and one or more inertial measurement units (IMU) 212E-F, and a rangefinder 212G. Combinations of information from one or more of source devices 212 may be used by processor 204 to provide valuable information to the user. For example, source devices 212B-D may be used to provide ballistics information, e.g., information related to ammunition trajectory. IMUs 212E and 212F can produce a compass heading as well as a 9-degree freedom of pose estimation (heading, inclination, and cant/roll). In certain embodiments, processor 204 can determine the geolocation coordinates of a target in the reticle crosshairs of the DEVO 100 using IMUs 212E-F. Processor 204 can be also designed and configured to allow for the transmission of information via any wireless standard or protocols, such as, but not limited to, RFID, Bluetooth, Wi-Fi, ZigBee, WiMax, WiGig, Ultra Wide Band, or a Wireless Wide Area Network (e.g., TDMA, CDMA, GSM, UMTS, EV-DO, LTE), etc.

Video processor 216 is specially configured to perform low power video processing. In an embodiment, video processor 216 is capable of processing information from up to six video inputs 220. Video processor 216 also drives the projector 224 and the display of information onto holographic image display 228. Video processor 216 can receive an external power supply from video input 220A and can receive external video feed(s) from video input 220B.

Projector 224 receives display information from video processor 216 and projects it to holographic image display 228. The combination of projector 224 and holographic image display 228 can be similar to the setup of holographic display system 120, with projector 224 sending display information through a lens, into a HOE, through an image guide, and to another HOE, before it is displayed to the user.

Figure 6:
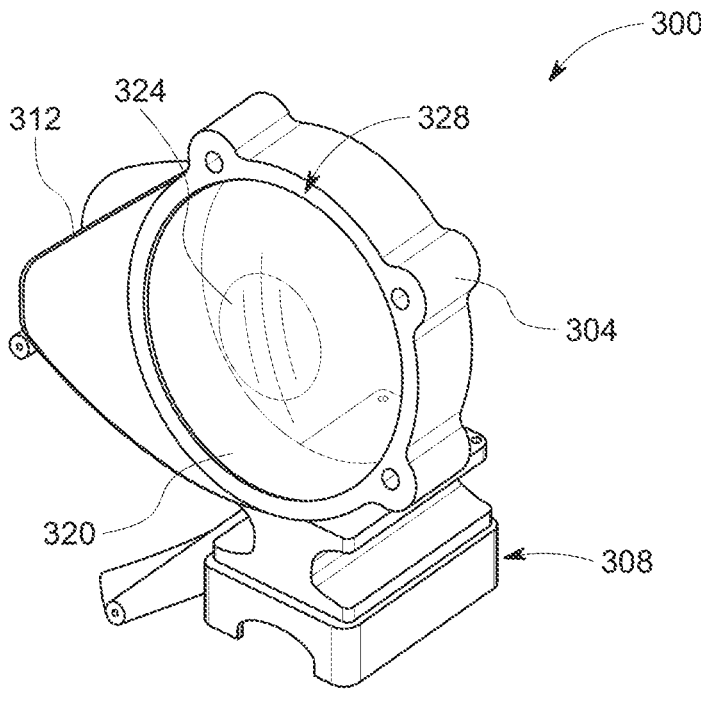
FIG. 6 is a perspective view of a holographic display system according to an embodiment of the present invention.

Turning now to a discussion of the positioning and configuration of a holographic display system and with reference to FIGS. 1 and 6 to 9, the holographic display system can be presented in a form factor suitable to the needs and desires of the user. For example, holographic display system 120 can be a separate device (as shown in FIGS. 1, 6, and 8A), removably couplable from a direct view optic, such as a rifle scope, or can be disposed partially or entirely internal to the direct view optic at various locations (described in more detail below, and all shown in FIG. 9). As shown in FIG. 1, holographic display system 120 is mounted proximate ocular lens group 116. In an embodiment, holographic display system 120 is a removably couplable to housing 104 using a clip-on style attachment mechanism. In this embodiment, with holographic display system 120 residing proximate the ocular lens group 116, the resolution of the display from the holographic display system is the same regardless of the zoom employed by the user using erector lens group 112. However, a disadvantage of this placement is the need to track the zoom setting for disturbed reticle. Although holographic display system 120 is shown mounted outside of housing 104 in FIG. 1, it can be located within the ocular lens group 116 or anywhere within the second focal plane.

An example of a holographic display system 300 as a separate device is shown in FIG. 6. Holographic display system 300 includes a casing 304, a coupler 308, an enclosure 312 with a light engine therein that transmits information to a waveguide 320 (and HOEs) which produces an image 324 for a user. Casing 304 houses and holds various components of the holographic display system and as shown in FIG. 6, provides an enclosure 312 for light engine and a receptacle 328 for waveguide 320. Casing 304 attaches to coupler 308, which is sized and configured to mount to a firearm.

Figure 7:
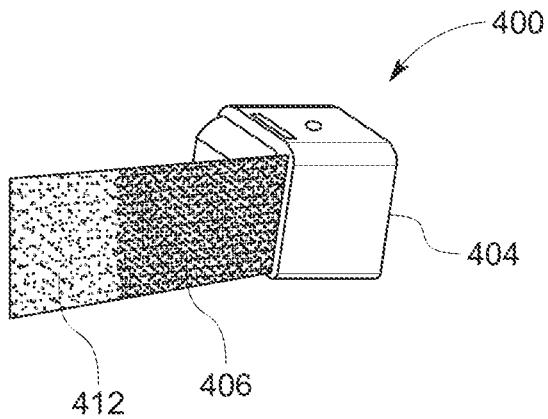
FIG. 7 is a perspective view of another holographic display system according to an embodiment of the present invention.

Another example of a holographic display system, holographic display system 400, is shown in FIG. 7. In this embodiment, holographic display system 400 has a form factor that allows for a light engine (found in enclosure 404) to reside external to a direct view optic while at least a portion of waveguide 406 (e.g., image portion 412) can reside inside the scope at a desired location.

Figure 8A:
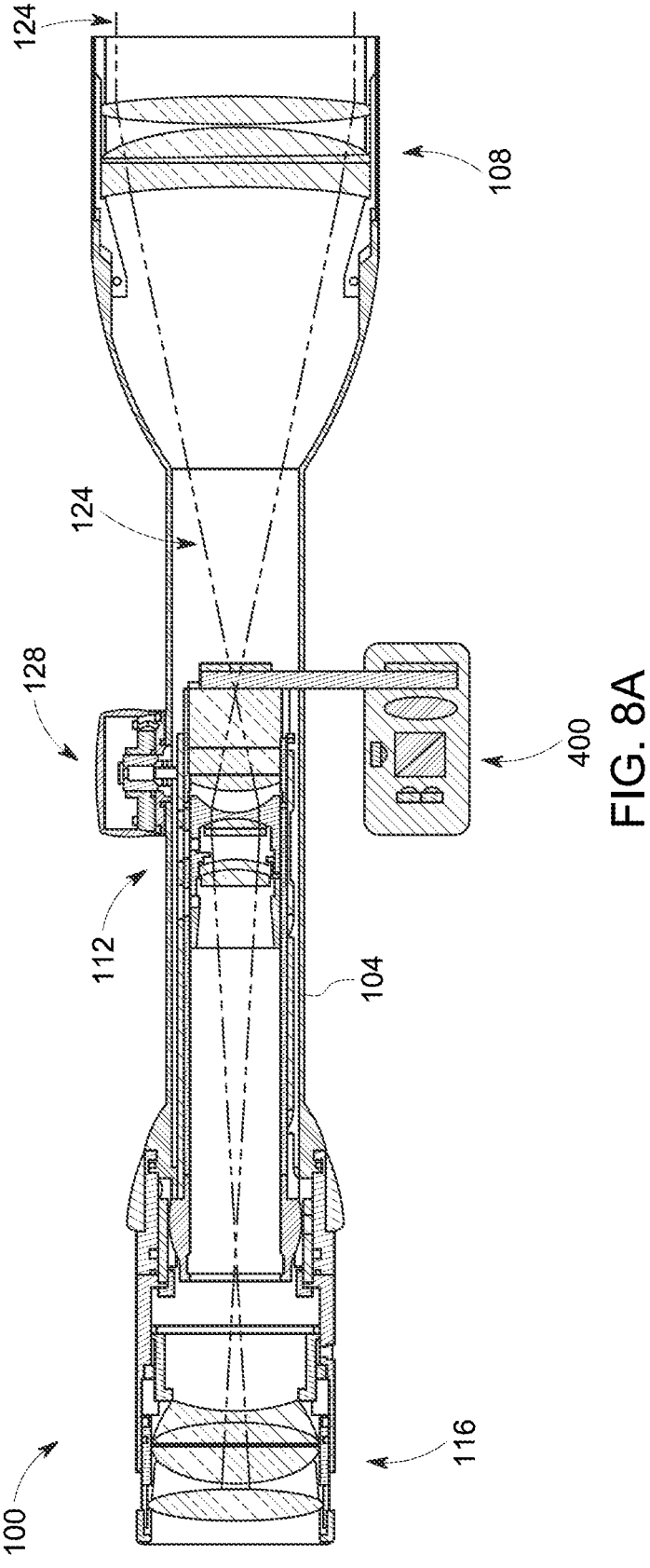
FIG. 8A is a cut-away perspective view of a direct enhanced view optic including a holographic display system according to an embodiment of the present invention.
Figure 8B:
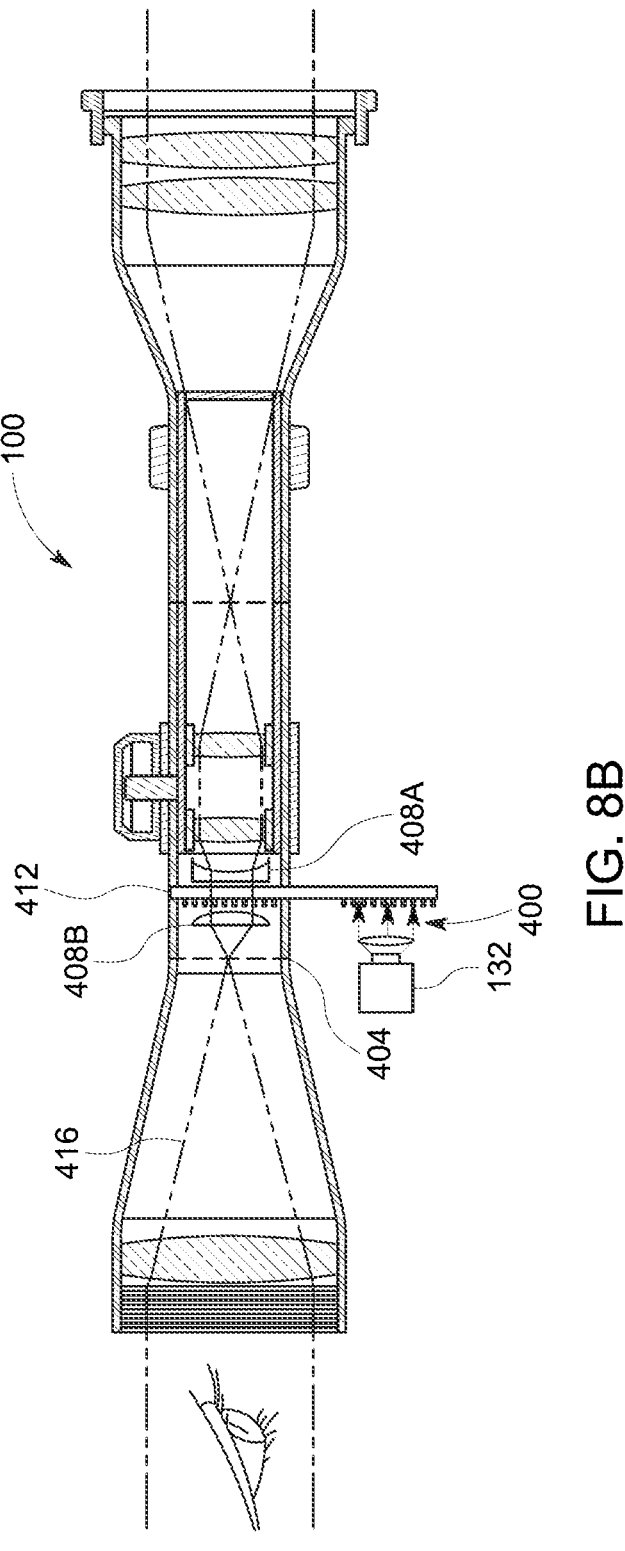
FIG. 8B is another cut-away perspective view of a direct enhanced view optic including a holographic display system according to an embodiment of the present invention.

An exemplary mounting of a holographic display system, such as holographic display system 400, is shown in FIG. 8A. In this embodiment, holographic display system 400 is positioned proximate erector lens group 112. The advantages of this positioning include easier alignment of images produced by the holographic display system with the reticle and the lack of a need to track zoom setting for reticles other than for text/graphics sizing. Holographic display system 400 can be disposed anywhere proximate the erector lens group as part of the first focal plane such that it is in line with the reticle.

FIG. 8B shows another embodiment of a mounting position for a holographic display system, such as holographic display system 400. Regardless of the position of holographic display system 400 within or outside of DEVO 100, the user expects that the real-world image visible through the DEVO and the displayed image coming from a light engine, such as light engine 132, will be aligned and focused. As shown in the embodiment of a DEVO in FIG. 8B, holographic display system 400 is positioned as part of the second focal plane 404 and includes optical components 408A and 408B, which, as mentioned above with respect to FIG. 2B, can assist with alignment and focus of images (both real-world and on the display) for the user. In an embodiment, optical components 408A and 408B can create a section of collimated light within DEVO 100. An image guide 412 can couple additional collimated light in the form of an image before it progresses through the rest of the optical DEVO path 416 and is focused into the user's eye. In another embodiment, optical components 408A and 408B can work cooperatively, with each optical component providing a desired optical function, which results in the proper alignment and focus of the real-world and the display image. Notably, various combinations (inclusion or exclusion) of HOE, refractive, diffractive, and hybrid optical elements may be used to ensure alignment and focus between the real-world view and displayed content.

Figure 9:
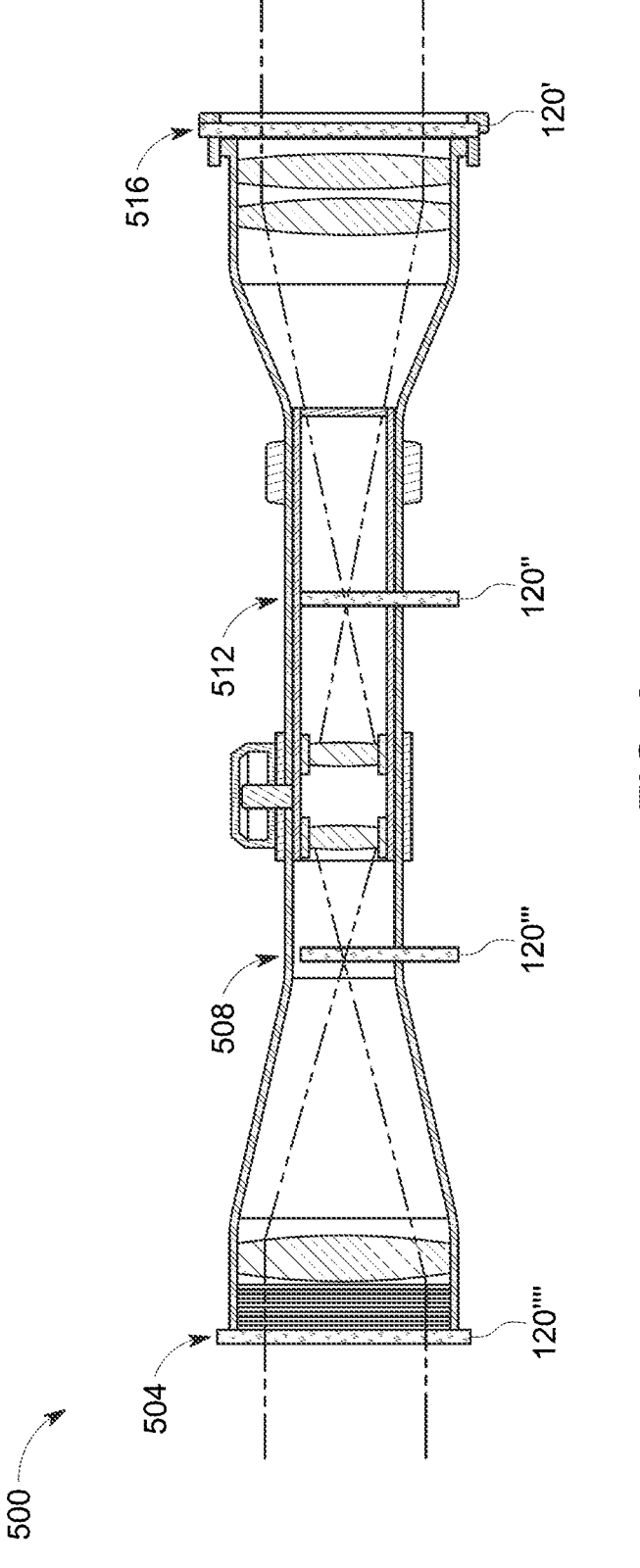
FIG. 9 is a cut-away perspective view of a direct enhanced view optic showing the exemplary locations of the holographic display system.

FIG. 9 shows a cut-away of an exemplary direct enhanced view optic 500 showing four possible locations for placing a holographic display system 120 (120'-120'''') on a DEVO: 1) at the ocular, location 504; 2) at the second focal plane, location 508; 3) at the first focal plane, location 512; and 4) at the objective, location 516. It will be understood that other locations are possible (some of which would require additional optics to adjust.)

Turning now to a discussion of the operation of a holographic display system, such as those described herein, as discussed above, the holographic display system is generally configured to provide a user with enhanced target acquisition information, such as real time ballistic solutions, fused thermal imaging, extended zoom, and automatic target recognition. Certain embodiments of the holographic display system can include one or more of the following components and capabilities: a laser rangefinder; a ballistics engine coupled to a plurality of sensors (such as environmental, elevation/cant, compass, and inertial measurement units); a high performance, low power image processing and neural network system; fusing of external imaging sensors with image processing to co-align off axis optical systems (e.g., thermal imagers or extended zoon camera on the side rail of a firearm); self-calibration techniques for displaying an image on the direct view optic (scope) reticle; real-time display of ballistic solutions; an interface to power/data rails; real-time image processing for inputted video, such as high dynamic range, sensor fusion, contrast enhancement, and low-light processing; displaying of geo-referenced augmented reality information; neural network automatic target recognition and highlighting (a box can be placed around people visible in the scope field of view or a "lock" on a user selectable object). The holographic display system can reduce time to acquire targets, increase situational awareness and first shot probability of hit, reduce mental loading, reduce training requirements, and increase overall lethality.

The light engine associated with the holographic display system includes one or more software modules that are accessible by a processor. The software modules assist in importing, correlating, processing, and generating data from external sources, image processing, ballistics, and the display to the user.

Image processing can include image enhancement, correction, and fusion of various external data sources coupled to the light engine. In an embodiment, image processing includes edge detection of a thermal sight overlay onto the display, aligning the overlay and compensating for latency. In this embodiment, IMUs can determine the motion of the scope and shift the location of the image on the display so as to align it with the images viewable through the direct view optic (DEVO) thereby reducing confusion and/or increasing situational awareness. In another embodiment, image processing includes perspective alignment for imagers not coaligned with the DEVO to solve the problem of parallax of an imager that is mounted on the side rail to the view of the DEVO. In an embodiment, imaging processing includes imaging enhancement such as high dynamic range enhancement, low light image enhancement, and contrast enhancement. In an embodiment, camera distortions such as barrel and radial distortions are corrected. In an embodiment, localized brightness adjustment can be conducted on a pixel by pixel basis. Notably, the same process used to overlay the thermal image can be applied to other image enhancements or augmentations, such as, but not limited to, low light imaging, short wave infrared, LIDAR, enhanced visible, ultraviolet, or a fusion of two or more thereof.

Figure 10:
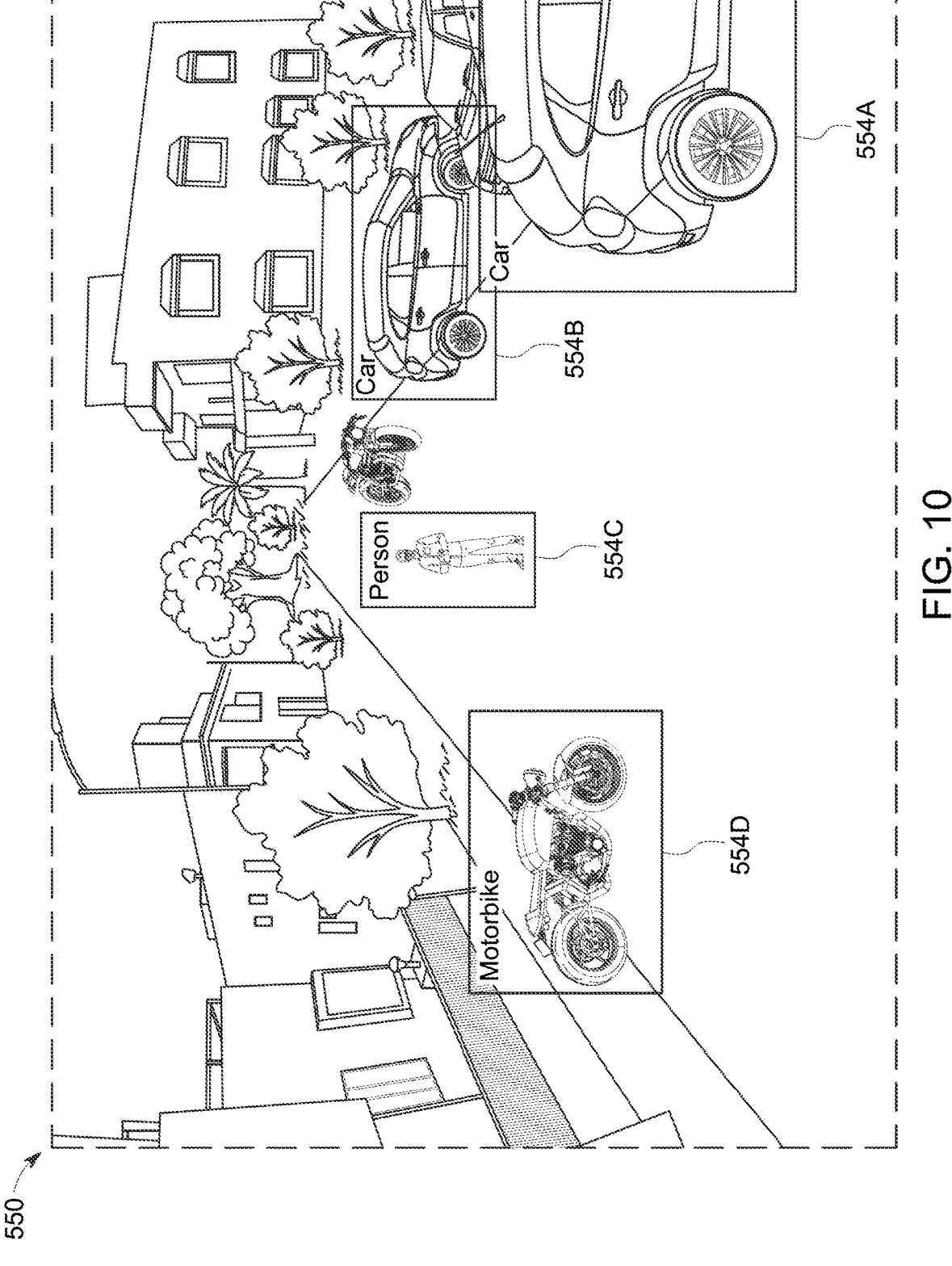
FIG. 10 is a graphical representation of a view through a direct enhanced view optic according to an embodiment of the present invention.

In an embodiment, and as shown in FIG. 10, a graphical representation of a view 550 through a direct enhanced view optic with a holographic display system can include target tracking. In this embodiment, a target is identified and a bounding box 554 (e.g., 554a-554d) is positioned around the target. So long as the bound target is in view of the sensor, it can be tracked. A convolutional neural network can be implemented such that the light engine can detect desired shapes, such as people, faces, weapons, vehicles, etc., and highlight them for the user, for example by including an identifier such as "Car" as shown in FIG. 10.

Without an accurate rangefinder and environmental sensor package, the probability of a hit may be less than 10% when engaging targets to the ranges of interest. This is primarily due to the user's inability to accurately measure the range to the target, gather the environmental data, and potentially input that directly into a ballistics computer. This process is time-consuming, error-prone, and incompatible with real-world engagement scenarios. Holographic display systems disclosed herein can couple the rangefinder to the environmental sensors for the automatic computation of fast and accurate fire control solutions, which is then displayed directly in the field-of-view of the direct view optic via the display.

The holographic display system can also provide for auto-triggering a firearm when on a locked target, range estimation using passive range finding by target pixel size both instantaneously and continuously if locked on a target, providing augmented reality information, bullet history, and overlaying counter-sniper detection systems, as well as remembering and predicting locked target positions.

Figure 11:
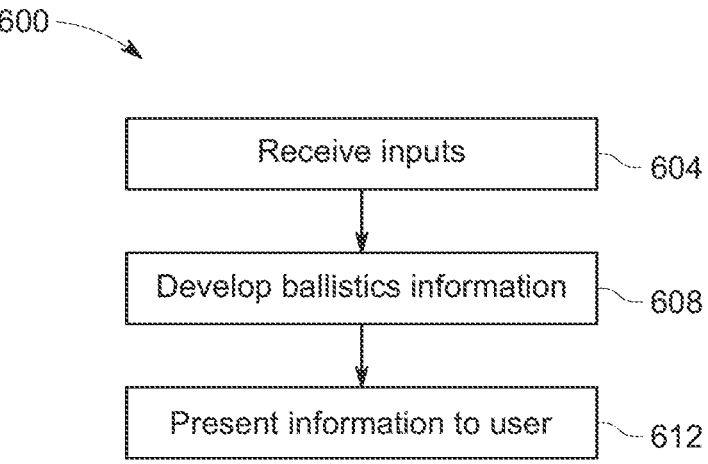
FIG. 11 is a process diagram of integrating sensor input to produce a holographic display with ballistic information according to embodiment of the present invention.

An exemplary process 600 for determining and displaying ballistics information is shown in FIG. 11. At step 604, inputs are received by, for example, a light engine and/or a ballistics engine. Inputs can include environmental inputs, video inputs, augmented reality inputs, motion inputs, and/or other sensed inputs.

A step 608, the ballistics information is developed. For example, certain information such as, wind speed, temperature, humidity, Coriolis effect based on heading, and GPS, can be used to estimate range to target. In certain embodiments, concomitant with developing ballistics information, situational enhancement information, e.g., light enhancement, relationships between targets, positions of associates, etc. is developed. When developed the two information types (situational and ballistics) can be fused together before being presented to a user.

At step 612, the information is presented to the user. In an embodiment, the information is overlaid onto the image viewable through a direct view optic.

Figure 12:
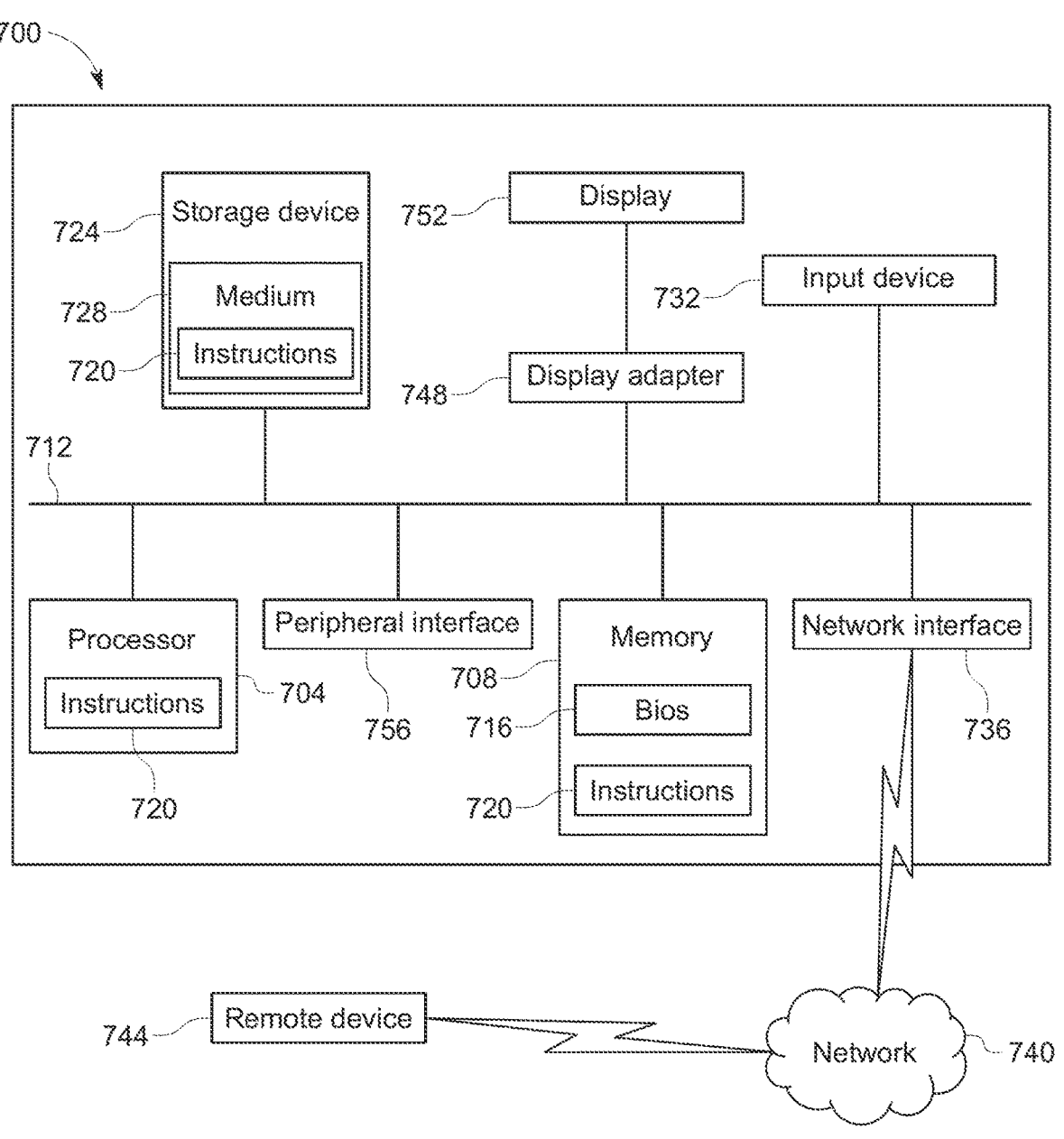
FIG. 12 is a computing system according to an embodiment of the present invention.

FIG. 12 shows a diagrammatic representation of one implementation of a machine/computing device 700 that can be used to implement a set of instructions for causing one or more components of a holographic display system, for example, light engine 132, to perform any one or more of the aspects and/or methodologies of the present disclosure. In general, an example holographic display system may be implemented as part of a direct view optic, however, other embodies of the holographic display system may be implemented as a wearable or body-mountable display device (also referred to as a wearable computing device), such as a head-mountable device (HMD), or display that may be attached or mounted to a user, such as by an arm-band, wrist band, wrist mount, or a chest-mount system, among other possibilities.

Device 700 includes a processor 704 and a memory 708 that communicate with each other, and with other components, such as inputs 160, via a bus 712. Processor 704 can be, for example, a micro-processor or a digital signal processor. Bus 712 may include any of several types of communication structures including, but not limited to, a memory bus, a memory controller, a peripheral bus, a local bus, and any combinations thereof, using any of a variety of architectures.

Memory 708 may include various components (e.g., machine-readable media) including, but not limited to, a random-access memory component (e.g., a static RAM "SRAM", a dynamic RAM "DRAM", etc.), a read-only component, and any combinations thereof. In one example, a basic input/output system 716 (BIOS), including basic routines that help to transfer information between elements within device 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Device 700 may also include a storage device 724. Examples of a storage device (e.g., storage device 724) include, but are not limited to, a hard disk drive for reading from and/or writing to a hard disk, a flash-drive, solid-state memory device, or other memory devices known in the art and any combinations thereof. Storage device 724 may be connected to bus 712 by an appropriate interface (not shown). Example interfaces include, but are not limited to, SCSI, advanced technology attachment (ATA), serial ATA, universal serial bus (all types) (USB), IEEE 1395, and any combinations thereof. In one example, storage device 724 may be removably interfaced with device 700 (e.g., via an external port connector). Particularly, storage device 724 and an associated machine-readable medium 728 may provide nonvolatile and/or volatile storage of machine-readable instructions, data structures, program modules, and/or other data for light engine 132. In one example, instructions 720 may reside, completely or partially, within machine-readable medium 728. In another example, instructions 720 may reside, completely or partially, within processor 704.

Device 700 may also include a connection to one or more inputs/sensors, such as inputs 160, 168, and/or source devices 212. Sensors may be interfaced to bus 712 via any of a variety of interfaces (not shown) including, but not limited to, a serial interface, a parallel interface, a game port, a USB interface, a FIREWIRE interface, a direct connection to bus 712, wireless, and any combinations thereof. Alternatively, in one example, a user of device 700 may enter commands and/or other information into device 700 via an input device (not shown). Examples of an input device 732 include, but are not limited to, an alpha-numeric input device (e.g., a keyboard), a pointing device, an audio input device (e.g., a microphone, a voice response system, etc.), a cursor control device (e.g., a mouse), a touchpad, an optical scanner, a video capture device (e.g., a still camera, a video camera), touchscreen, and any combinations thereof.

A user may also input commands and/or other information to device 700 via storage device 724 (e.g., a removable disk drive, a flash drive, etc.) and/or a network interface device

736. A network interface device, such as network interface device 736, may be utilized for connecting device 700 to one or more of a variety of networks, such as network 740, and one or more remote devices 744 connected thereto. Examples of a network interface device include, but are not limited to, a network interface card, a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 740, may employ a wired and/or a wireless mode of communication. In general, any network topology may be used. Information (e.g., data, instructions 720, etc.) may be communicated to and/or from device 700 via network interface device 736.

In some embodiments, device 700 may receive video, sensor or other data wirelessly according to one or more wireless standards or protocols, such as, but not limited to, RFID, Bluetooth, Wi-Fi, ZigBee, WiMax, WiGig, Ultra Wide Band, or a Wireless Wide Area Network (e.g., TDMA, CDMA, GSM, UMTS, EV-DO, LTE), etc. In other embodiments, processing device 330 may receive the video, sensor or other data by one or more wired protocols such as, but not limited to, a Universal Serial Bus protocol, a Registered Jack protocol (e.g., RJ-25), or a wired Local Area Network protocol (e.g., Ethernet). In other examples, video, sensor and other data may be received by the processing device from a portable storage device such as a memory card, flash drive, or zip drive.

Device 700 may further include a video display adapter 748 for communicating a displayable image to a display device 752. Examples of a display device 752 include, but are not limited to, a holographic display, a liquid crystal display (LCD), a plasma display, and any combinations thereof.

In addition to display device 752, device 700 may include a connection to one or more other peripheral output devices including, for example, an audio speaker. Peripheral output devices may be connected to bus 712 via a peripheral interface 756. Examples of a peripheral interface include, but are not limited to, a serial port, a USB connection, a FIREWIRE connection, a parallel connection, a wireless connection, and any combinations thereof.

While the embodiments described herein are examples related to firearms and ballistics, it will be understood that the holographic display system of the present invention may enhance a user's view through any optical instrument, including telescopes, binoculars, microscopes, and cameras.

In an exemplary embodiment, a display system for enhancing a user's view through an optical instrument includes holographic display component configured to be coupled to the optical instrument. The holographic display component includes a light engine, a lens, at least one holographic optical element, and an image guide. When coupled to the optical instrument, the holographic display component transmits a see-through holographic image overlay on the user's view through the optical instrument.

Additionally or alternatively, the at least one holographic optical elements is prepared by directing two laser beams at a substrate so as to form a grating with a pattern of straight lines with a sinusoidal cross section.

In another exemplary embodiment, a direct view optic for a firearm includes an optical device having a front objective, a rear ocular exit, and a waveguide. The front objective and the rear ocular exit are separated by the waveguide and the optical device provides a distant image onto a display. A diffractive based holographic display system is coupled to the optical device, and the holographic display system provides a see-through information overlay on the display.

Additionally or alternatively, the diffractive based holographic display system includes a light engine capable of enhancing both night and sunlight readability of the see-through information overlay on the display.

Additionally or alternatively, the diffractive based holographic display system includes a ballistics engine, the ballistics engine being coupled to a plurality of sensors, each of the plurality of sensors providing a signal to the ballistics engine, each signal representative of information related to an acquisition of a target.

Additionally or alternatively, the plurality of sensors includes one or more of: an atmospheric sensor, a global positioning sensor, an inertial measurement unit sensor, a digital compass, a wind sensor, and a temperature sensor.

Additionally or alternatively, the diffractive based holographic display system is placed before the front objective.

Additionally or alternatively, the diffractive based holographic display system is placed after the rear ocular exit.

Additionally or alternatively, the diffractive based holographic display system is placed between the front objective and rear ocular exit.

Additionally or alternatively, the diffractive based holographic display system is a clip-on style device that is releasably coupled to the direct view optic.

Additionally or alternatively, at least a portion of the diffractive based holographic display system is integrated inside a housing of the optical device.

Additionally or alternatively, an external imaging device is included, the external imaging device producing an imaging output, the imaging output being overlaid on the display.

Additionally or alternatively, the imaging output is a thermal characterization.

Additionally or alternatively, the imaging output is one or more of a thermal image, a low light image enhancement image, a short wave infrared image, a LIDAR image, an enhanced visible image, and an ultraviolet image.

Additionally or alternatively, the information overlay includes geo-referenced augmented reality information.

Additionally or alternatively, the information overlay includes target recognition.

Additionally or alternatively, the information overlay includes a target indicator.

Additionally or alternatively, the target indicator includes a lead system.

Additionally or alternatively, the target indicator provides calculated impact points.

Additionally or alternatively, the information overlay includes a locking target indicator.

Additionally or alternatively, the information overlay includes multiple locking target indictors each representing a possible target.

Additionally or alternatively, the direct view optic includes a transmitter, the transmitter sending the distant image and/or information on the display to an external receiver.

Additionally or alternatively, the direct view optic includes a processor and a plurality of sensors, the processor receiving information from the plurality of sensors so as to determine the location of the distant image.

Additionally or alternatively, the holographic display system provides a full color image on the display.

Additionally or alternatively, the processor uses augmented to passively estimate or update ranges to a target based on a size of a captured image of the target.

Additionally or alternatively, the processor determines whether the target is in a sitting, standing, kneeling, or prone position and then estimate the size of the target.

Additionally or alternatively, a rangefinder is included that determines at least one active measurement of the target, and wherein the processor estimates any remaining targets in a field of view based on the at least one active measurement.

Additionally or alternatively, the rangefinder includes one or more of a LIDAR, a wavefront camera, and a time of flight camera, and determines a range of multiple points in the field of view.

Additionally or alternatively, the holographic display system is used as a receiver aperture for an optical source.

Additionally or alternatively, the optical source is an imaging sensor or the rangefinder.

Additionally or alternatively, the holographic display system tracks a user's eye in reference to a reticle.

Additionally or alternatively, the holographic display system determines the user's cheek weld position.

Additionally or alternatively, the holographic display system determines the ability of the user to use the firearm.

Additionally or alternatively, the holographic display system conducts a shooter authentication or identification.

Additionally or alternatively, the holographic display system transmits what the user is seeing on the display, with or without overlay information, to another location away from the user.

Additionally or alternatively, the direct view optic includes a processor and a plurality of sensors, wherein the processor can determine, from information received by the sensors, where a user is aiming the firearm and provide one or more of the azimuth, inclination, and the GPS coordinate to the user.

Additionally or alternatively, the holographic display system communicates a location of a round of ammunition shot from the firearm while the ammunition is in flight on the display.

Additionally or alternatively, the holographic display system tracks the round of ammunition shot from the firearm while the round is in flight and directs the round while the round is in flight.

In another embodiment, a safe triggering firearm with direct view optic is provided that includes a firearm including a locking mechanism, an optical device operatively coupled to the locking mechanism, the optical device having a front objective, a rear ocular exit, and a waveguide, the front objective and the rear ocular exit separated by the waveguide, wherein the optical device provides a distant image onto a display, and a diffractive based holographic display system coupled to the optical device. The holographic display system provides a see-through information overlay on the display and the diffractive based holographic display system includes a processor including a set of instructions for identifying a target from the display, locking onto the target, and unlocking the locking mechanism only after locking onto the target.

Additionally or alternatively, a range estimator is included, the range estimator designed and configured to update the distance to target after locking onto the target.

Additionally or alternatively, the processor further predicts and displays a projected projectile path onto the display.

Additionally or alternatively, the processor further predicts the future position of the target after locking onto the target.

Additionally or alternatively, the processor further determines the future position of the target after movement of the safe triggering firearm.

Additionally or alternatively, the diffractive based holographic display system includes a light engine capable of enhancing both night and sunlight readability.

Additionally or alternatively, the diffractive based holographic display system includes a ballistics engine, the ballistics engine being coupled to a plurality of sensors, each of the plurality of sensors providing a signal to the ballistics engine, each signal representative of information related to the acquisition of the target.

Additionally or alternatively, the safe triggering firearm further includes additional optical components configured to place the see-through information overlay onto a first focal plane such that the see-through information overlay does not interfere with the distant image.

In another embodiment, a display system for enhancing a user's view through an optical instrument includes a diffractive based holographic display component configured to be coupled to the optical instrument. The holographic display component includes a light engine, a lens, a plurality of holographic optical elements, and an image guide. When coupled to the optical instrument, the holographic display component transmits a see-through holographic image overlay on the user's view.

Additionally or alternatively, each of the plurality of holographic optical elements are prepared by directing two laser beams at a substrate so as to form a grating with a pattern of straight lines with a sinusoidal cross section in which the pitch of the grating is approximately $\lambda/\sin\theta$.

In another embodiment, a holographic display system for attaching to a firearm, includes a casing having an enclosure and a receptacle, a light engine housed in the enclosure, a waveguide encompassed by the receptacle, and a coupler attached to the casing, the coupler sized and configured to mount to the firearm. The light engine transmits information to the waveguide and the waveguide produces a holographic image to a user of the display system.

Additionally or alternatively, the system includes a plurality of holographic optical elements.

Additionally or alternatively, the holographic image includes a thermal characterization.

Additionally or alternatively, the holographic image includes a low light image enhancement image, a short wave infrared image, a LIDAR image, an enhanced visible image, and an ultraviolet image.

In another embodiment, a holographic display system for inclusion with a direct enhanced view optic that is used to enhance the view of a scene includes a processor configured to receive signals from respective ones of a plurality of remote source devices and to prepare information based upon the signals, a video processor in electronic communication with the processor and configured to receive a plurality of video inputs and the information and perform low power video processing so as to prepare displayable information, a projector configured to receive the displayable information from the video processor and to project images representative of the displayable information, and a holographic image display configured to receive the images from the projector and to display the images to a user. The images are based on the information received by the processor and the plurality of video inputs.

Additionally or alternatively, the plurality of remote source devices includes a GPS sensor, a temperature sensor, a pressure sensor, a humidity sensor, and an inertial measurement unit.

Additionally or alternatively, the system further includes a port and at least one ancillary device, wherein the port aligns the output of ancillary device with a scene viewable through the direct enhanced view optic, and wherein the ancillary device is selected from the list of: a thermal camera, an optical zoom, and a night vision device.

Additionally or alternatively, the processor determines geolocation coordinates of a target in reticle crosshairs of the direct enhanced view optic using an inertial measurement unit.

Additionally or alternatively, the system further includes a ballistics engine, wherein the ballistics engine determines a distance to a target and a projected projectile path.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A holographic display system for attaching to a firearm, the holographic display system comprising:
 a casing including an enclosure and a receptacle;
 a light engine housed in the enclosure;
 a waveguide encompassed by the receptacle;
 a first holographic optical element at a first end of the waveguide and positioned between the light engine and the waveguide;
 a second holographic optical element at a second end of the waveguide; and
 a coupler attached to the casing, the coupler sized and configured to mount to the firearm, wherein the light engine is configured to generate and transmit displayable information to the first holographic optical element, wherein the first holographic optical element is positioned and configured to guide the displayable information into the waveguide, and wherein the waveguide is configured to propagate the displayable information and transmit, via the second holographic optical element, the displayable information as an image to a user of the holographic display system; and
 a front objective and a rear ocular exit, wherein the waveguide is positioned between the front objective and the rear ocular exit such that the displayable information exits the waveguide in a second focal plane of the holographic display system.

2. The holographic display system according to claim 1, wherein the image includes a thermal characterization.

3. The holographic display system according to claim 1, wherein the first holographic optical element includes a first diffractive grating.

* * * * *